US007350230B2

(12) United States Patent
Forrest (10) Patent No.: US 7,350,230 B2
(45) Date of Patent: Mar. 25, 2008

(54) WIRELESS SECURITY MODULE

(75) Inventor: Simon J. Forrest, Dundee (GB)

(73) Assignee: NCR Corporation, Dayton, OH (US)

( * ) Notice: Subject to any disclaimer, the term of this patent is extended or adjusted under 35 U.S.C. 154(b) by 779 days.

(21) Appl. No.: 10/732,655

(22) Filed: Dec. 10, 2003

(65) Prior Publication Data

US 2004/0124966 A1 Jul. 1, 2004

(30) Foreign Application Priority Data

Dec. 18, 2002 (GB) ................................. 0229553.3

(51) Int. Cl.
| | |
|---|---|
| G06F 15/16 | (2006.01) |
| G06F 17/30 | (2006.01) |
| G06F 7/04 | (2006.01) |
| G06F 7/58 | (2006.01) |
| H04L 9/00 | (2006.01) |
| G06Q 99/00 | (2006.01) |
| H04K 1/00 | (2006.01) |

(52) U.S. Cl. ........................... 726/9; 713/155; 713/184; 713/185; 705/67

(58) Field of Classification Search .................... 726/9; 713/155, 184, 185; 705/67
See application file for complete search history.

(56) References Cited

U.S. PATENT DOCUMENTS 5,053,774 A * 10/1991 Schuermann et al. ..... 340/10.34
5,668,876 A * 9/1997 Falk et al. ................... 380/271
6,484,260 B1 * 11/2002 Scott et al. .................. 713/186
2002/0062284 A1 * 5/2002 Kawan ......................... 705/43

FOREIGN PATENT DOCUMENTS

| EP | 0 933 733 A2 | 8/1999 |
|---|---|---|
| KR | 20010165838 A | 3/2001 |
| WO | WO 00/00928 | 1/2000 |
| WO | WO 01/99369 A2 | 12/2001 |
| WO | WO 02/095689 A1 | 11/2002 |
| WO | WO 02/096150 A1 | 11/2002 |

* cited by examiner

Primary Examiner—Kambiz Zand
Assistant Examiner—Michael J Simitoski
(74) Attorney, Agent, or Firm—Priest & Goldstein PLLC (57) ABSTRACT

A wireless security module (20) adapted to authenticate a mobile device (16), such as a mobile telephone, thereby to allow communication between the mobile device and a terminal (12), such as a self-service terminal. The wireless security module (20) is paired with the mobile device (16) and is adapted to send an authentication signal to the mobile device (16) or the terminal (12) using a wireless communication path, such as a telecommunications network or an IR link or a Bluetooth connection.

34 Claims, 3 Drawing Sheets

WIRELESS SECURITY MODULE

BACKGROUND OF THE INVENTION

The present invention relates to a wireless security module. In particular, the present invention relates to a wireless security module for authenticating communications between a mobile device, such as a mobile telephone, and a self-service terminal, such as an automated teller machine.

With the ever-increasing popularity of mobile telephones and other such wireless devices, there is a drive towards allowing consumers to access more and more different types of services via their mobile telephones. In particular, there are moves towards enabling a consumer to interact with banking services using mobile devices. However, when a consumer wishes to carry out financial transactions from a mobile device, either a telephone or PDA, numerous security issues arise. These are mainly to do with the authentication of the consumer and the consumer's device.

Security problems are particularly acute where the mobile device is to be used to allow a consumer to remove cash from, say, an automated teller machine. In this case, as well as verifying that the user is who he claims to be, it is important to make sure that he is within close proximity to the machine, so that when cash is dispensed, the user is there to collect it. To overcome some of these security issues, it has been proposed that the user's mobile telephone be adapted to include security hardware and software for interacting with terminals. A disadvantage of the need for additional hardware is, however, that it requires modification to the user's mobile device. Clearly, this is a significant limitation. There is therefore a need for a simple and secure system for allowing communication between mobile devices such as mobile telephones and terminals such as self-service terminals.

SUMMARY OF THE INVENTION

According to one aspect of the invention, there is provided a system for authenticating a mobile device, the system comprising: a wireless security module or device that is paired with the mobile device and adapted to send an authentication signal for authenticating the mobile device; and means for authenticating the mobile device using the authentication signal received from the wireless security module.

The system may further comprise a wireless receiver for receiving the authentication signal. The wireless receiver may be provided in a terminal. The terminal may be a self service terminal, such as an automated teller machine. In the event that the mobile device is authenticated, the terminal may be operable to provide a service requested from the mobile device. The terminal may be operable to communicate with the mobile device to provide the requested service. The terminal may be part of a network of terminals. The terminal may be operable to communicate with a control center. The terminal may be adapted to send the authentication signal to the control center, and receive from the control center a return signal indicative of whether the mobile device is authenticated.

The authentication signal may include a unique identifier associated with the security module.

The authentication signal may include details of the mobile device, such as a telephone number or an electronic address.

The security module may include an encryptor for encrypting the authentication signal. In this case, the system further comprises means for decrypting the authentication signal.

All or at least part of the wireless security module is tamper proof.

According to another aspect of the invention, there is provided a method for authenticating a mobile device, such as a mobile telephone, the method comprising: sending an authentication signal from a wireless security module that is separate from the mobile device, but paired thereto; receiving the authentication signal and using the authentication signal to authenticate the mobile device.

According to yet another aspect of the invention, there is provided a wireless security module or device adapted to authenticate a mobile device, such as a mobile telephone, the wireless security module being paired with a mobile device and adapted to send an authentication signal to a means for authenticating the mobile using a wireless communication path, such as a telecommunications network.

The authentication signal preferably includes a unique identifier for identifying the module uniquely.

The module or device may include a proximity tag for identifying the proximity of the device relative to a terminal. The proximity tag may be an RFID tag.

The module or device may include a secure memory for storing one or more identifiers for identifying the user's mobile device.

The wireless security module or device may include an encryptor for encrypting messages for sending to the mobile device or terminal.

The wireless security module or device may be adapted to communicate with the mobile device.

The wireless security module or device may comprise a smart card or secure hard drive that can be accessed wirelessly.

The wireless security module or device may be adapted to send the authentication signal to a terminal, for example a self service terminal such as an automated teller machine.

According to yet another aspect of the invention there is provided a self service terminal, such as an automated teller machine (ATM), that is adapted to receive from a wireless security module an authentication signal for authenticating a mobile device; use that signal to determine whether the mobile device is authorized to access services and in the event that the mobile device is authenticated, provide information and/or services requested from the mobile device.

The self service terminal may be adapted to communicate with the mobile device.

The self service terminal may be adapted to communicate with a remotely located control center in order to determine whether the mobile device is authorized. The terminal may be adapted to receive details of the service requested by the mobile device from the control center.

According to a still further aspect of the invention, there is provided a self service terminal, such as an ATM, that comprises means for receiving from a wireless security module an authentication signal for authenticating a mobile device; means for determining whether the mobile device is authorized to access services based on the authentication signal received and means for providing information and/or services requested from the mobile device, in the event that the mobile device is authenticated.

According to a yet still further aspect of the invention, there is provided a mobile device, such as a mobile telephone, adapted for use with the system, security module, method or terminal of any of the preceding claims.

BRIEF DESCRIPTION OF THE DRAWINGS

Various aspects of the present invention will now be described by way of example only, with reference to the accompanying drawings, of which.

DETAILED DESCRIPTION

Figure 1:
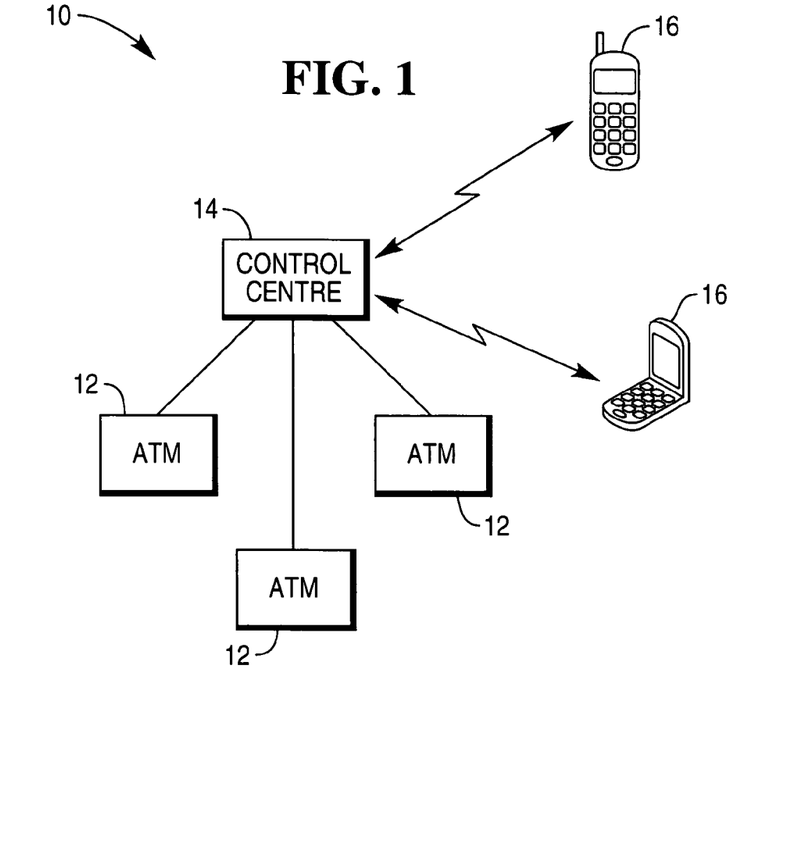
FIG. 1 is schematic diagram of an ATM network.

FIG. 1 shows an ATM network 10, in which each of the ATMs 12 is connected to and able to communicate with a control center 14. The connection between the ATMs 12 and the control center 14 can be via any suitable network such as a dedicated intranet or the internet. Alternatively, the ATMs 12 and the control center 14 may be adapted to communicate via a wireless communications network, such as a telecommunications network.

The control center 14 is operable to control, monitor and/or provide services that are accessible via the ATMs. In accordance with practice in typical ATM networks, the control center 14 stores details of all authorized users of the network, such as their names and addresses and personal identification numbers (PINs). These can be stored locally or globally. It should be noted that whilst the control center 14 is shown schematically in FIG. 1 as being a single unit, it could comprise a distributed grouping of processors or servers.

In addition to communicating with the ATMs 12, the control center 14 is adapted to communicate with mobile devices 16 that are associated with authorized users of the services provided by the control center and the ATMs. The mobile devices 16 may be, for example, mobile telephones or PDAs. Communication between the mobile telephones 16 and the control center 14 may be carried out using a wireless telecommunications network, such as a cell phone network, or any other suitable wireless network.

In order to identify mobile devices 16 belonging to particular users, the telephone number or electronic address of these are stored at the control center 14 together with the user's name, address and personal identification (PIN) number. In this way, when a user accesses control center services using their mobile device 16, a preliminary check can be done to identify the user, merely by comparing the telephone number or electronic address of the incoming communication. It will be appreciated, however, that whilst providing a check of this type may be adequate for some services, this level of identification alone does not provide sufficient security for most financial transactions and would pose a risk were the user's mobile telephone to be stolen.

Figure 2:
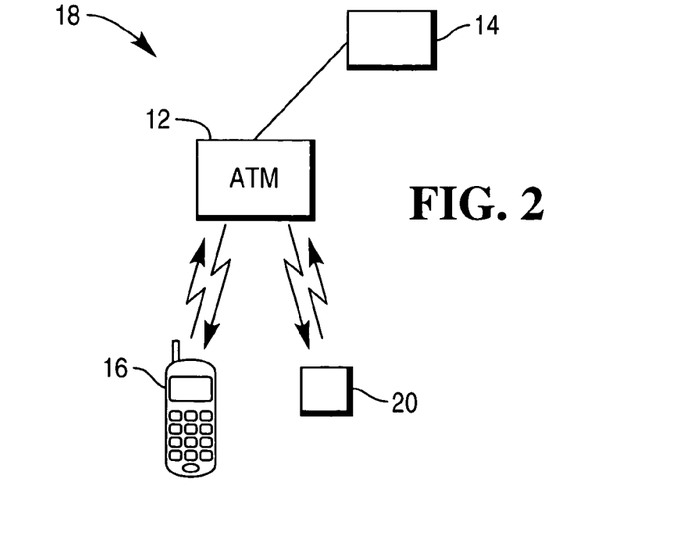
FIG. 2 is a schematic diagram of an authentication system for allowing an ATM to interact with a mobile telephone.

FIG. 2 shows a system 18 for allowing secure communication between a mobile telephone 16 and a designated one of the ATMs 12 in the network of FIG. 1. In this system 18, the ATM 12 is operable to communicate via a wireless network with the mobile telephone 16 and additionally a wireless security module 20. Each wireless security module 20 is associated with one or more authorized mobile devices 16 and provides a means for authenticating these devices, thereby to allow communication between the devices 16 and the ATM 12.

Figure 3:
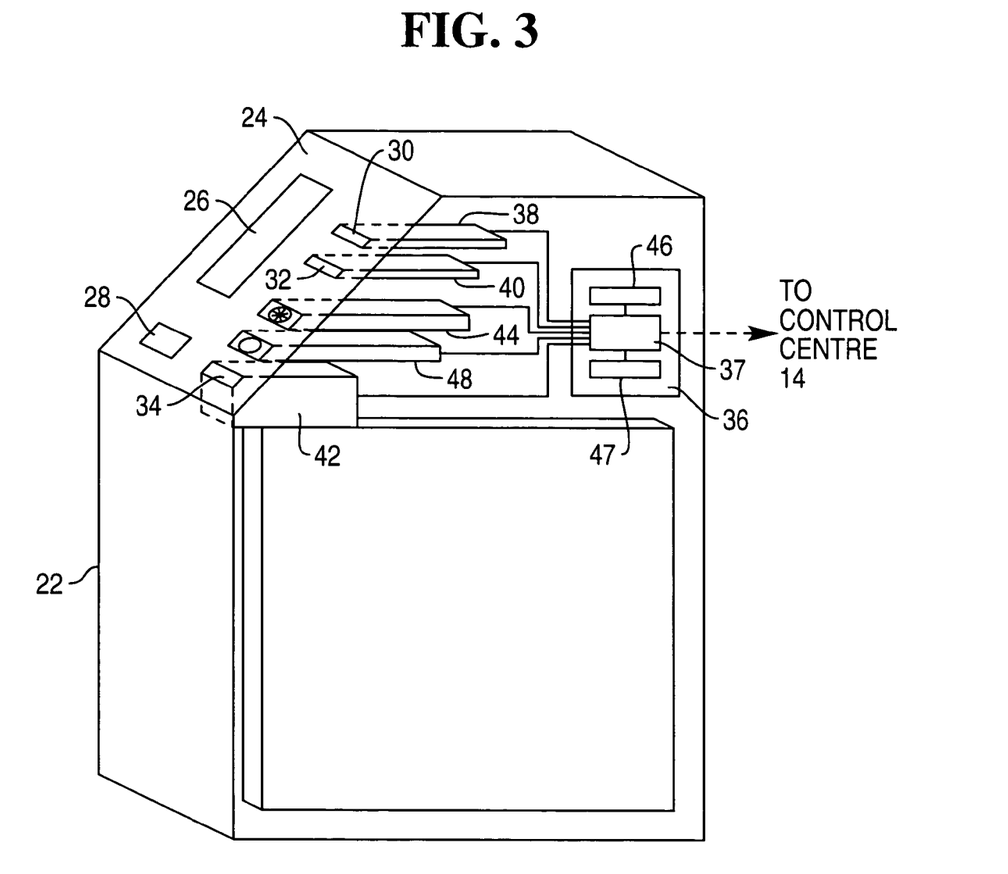
FIG. 3 is a block diagram of an ATM for use in the system of FIG. 2.

FIG. 3 shows the automated teller machine 12 of FIG. 2 in more detail. This has a housing 22 with a front fascia 24 that has a screen 26 for presenting financial information to a customer; a keyboard 28 for receiving user inputs; a card slot 30 for receiving a customer's card; a print-out slot 32 through which printed material is dispensed and a slot 34 for dispensing cash through. Included in the ATM housing 22 is a control module 36 that is operable to control access to the banking network and any financial transactions. The control module includes a processor 37 that is connected to each of a card reader mechanism 38 that is aligned with the card slot 30, a printer 40 that is aligned with the print out slot 32 and a dispensing mechanism 42 that is aligned with the dispensing slot 34. The card reader mechanism 38 is operable to receive and read cards that are inserted into the slot 30. Information read from the card by the card reader 38 can be transmitted to the control module 36 for further processing. The printer 40 is operable to print out financial information, such as bank statements, under the control of the control module 36. The dispensing mechanism 42 is operable to dispense cash that is stored in a secure enclosure, again under the control of the control module 36.

All of the previously described features of FIG. 3 are commonplace in ATMs and so will not be described in detail. In order to participate in the authentication procedure for authenticating mobile devices, included in the ATM 12 are the following additional components: a communications module 44 for receiving signals from and transmitting signals to each of the mobile device 16 and the secure module 20 using a wireless path; a control application 46 for allowing users to access services using mobile devices 16; a secure memory 47, and a mechanism 48 for generating some form of reader field, which can detect the presence of a security module 20 within its vicinity. Each of these additional components is connected to and/or able to communicate with the processor 37 in the core module 36. The communications module 44 may include, for example, an IR port or any other suitable wireless communication transceiver for supporting wireless communications such as Bluetooth. Of course, in order to maximize the number of devices that the ATM 12 can communicate with, the communications module 44 may include each of an IR port and a Bluetooth port. The control application 46 includes an encryption module for encrypting signals for sending to the security module 20 and a decryption module for decrypting signals received from the security module 20.

Using wireless technology, the security module 20 of FIG. 2 is adapted to provide both authentication and location information, thereby allowing the ATM 12 to provide secure services, such as dispensing cash. Each mobile device 16 is associated with a particular one of the security modules 20, the mobile device 16 and security module 20 pair being associated in turn with a pre-determined user of the system. In order to authenticate a mobile device 16, the security module 20 firstly has to be paired with that mobile device.

Figure 4:
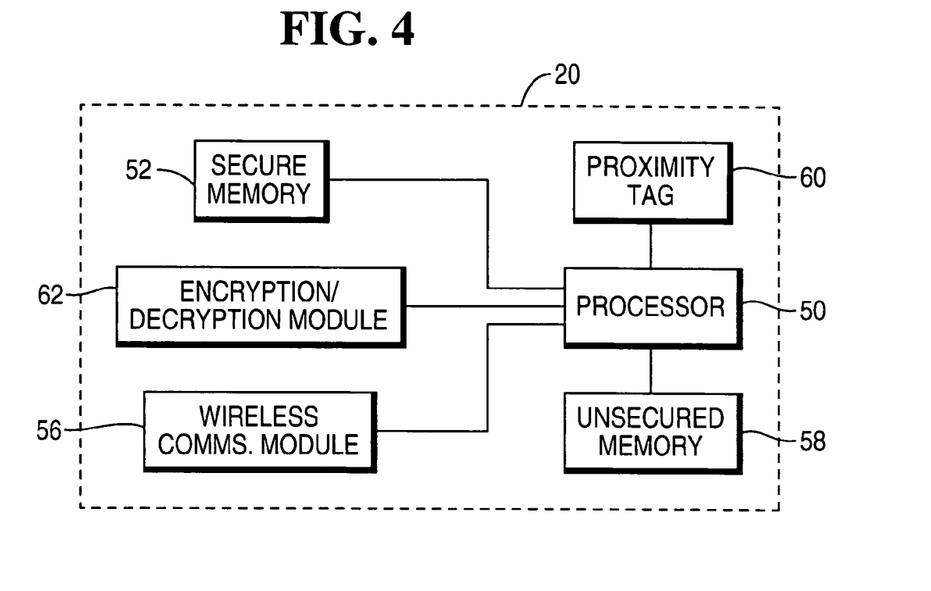
FIG. 4 is a block diagram of a security module for use in the system of FIG. 2.

FIG. 4 shows the security module 20. From this it can be seen that it includes a processor 50 that can communicate with a secure memory module 52. Stored in the memory module 52 are an authentication application for implementing an authentication procedure; details of the user's mobile telephone, such as the telephone number, and a unique identifier associated with the security module 20, as well as other authentication information. The unique identifier is written into the secure memory 52 during manufacture of the security module 20 and is additionally stored in the control center 14, together with the other user details, such as name, address, PIN and mobile telephone number.

As well as the secure memory 52, the security module 20 includes the following features: a communication module 56 that is operable to transmit signals to and receive signals from each of the mobile device 16 and the ATM 12—this may be an IR based unit or Bluetooth, depending on the communication mechanism used by the mobile device 16 and the ATM 12; an unsecured memory 58 for running a financial application; a proximity tag 60, such as RFID, for providing proximity information for the fulfillment of various transactions by the consumer, and an encryption module 62.

Included in the encryption module 62 is an algorithm for encrypting messages for sending between the security module 20 and the ATM 12. Any suitable encryption method could be employed. As an example, however, asymmetric encryption is used. This means that the key for encrypting the message and the key for decrypting the message are different. In one asymmetric encryption scheme, the ATM 12 has a private key and access, via the central control center 14, to a public key associated with the security module 20. Included in the secure memory 52 of the security module 20 for use by the encryption module 62 is a unique private key. Also stored in the secure memory 52 is a public key associated with the ATM 12 or the overall network. This public key can be securely written into the security module 20 during initialization. Messages sent from the secure module 20 to the ATM 12 are encrypted using the ATM's public key stored in the memory 52 and decrypted at the ATM 12 using its private key. Likewise, messages sent from the ATM 12 to the security module 20 are encrypted at the ATM 12 using the module's public key and then decrypted in the module 20 using its private key, which is stored in the secure memory 52. In this way, the security module 20 and the ATM 12 can mutually authenticate each other. This stops the security module 20 from connecting to a fake ATM 12, which has a copy of the module's public key.

As another option, the encryption may use a public key infrastructure (PKI). In this case, the security module 20 has the bank's public key and the ATM 12 has a public key that is associated with all authorized secure modules provided for use in the network. When an ATM 12 wishes to communicate with the secure module 20, it sends a certificate, such as a X.509 certificate containing the individual ATM's public key, which has been signed using the bank's public key. The security module 20 verifies the signature using the bank's public key, which is stored in its secure memory 51. If the verification is positive, this provides the module 20 with the public key for the ATM. Otherwise, the communication is terminated. Likewise, when the module 20 wishes to communicate with the ATM 12, it sends a certificate, such as the X.509 certificate, that contains its own public key, signed using a wireless service key. It should be noted that in this case the certificate would be loaded into both the ATM 12 and the secure module 20 pre-signed by the bank and so these certificates are not created in either of the ATM or secure module 20. This means that private keys do not have to be stored in either of the ATM 12 or the module 20.

Once the initial exchange is completed, authentication is carried out using the ATM's public key and the module's public key. An advantage of this is that the mobile device does not have to know the public keys for each ATM 12 in the network and the ATM 12 does not have to have access to the public keys for every secure module 20. It also allows normal PKI functions to be carried out, such as key revocation and key updates. The secure module 20 includes some form of tamper resistance to protect its integrity, and in particular to prevent access to information stored in the secure memory 52. The tamper resistance could for example involve encasing the secure memory in resin, the arrangement being such that should the memory be physically tampered with, it is automatically erased. This provides a mechanism for protecting the unique identifier associated with the card, as well as the encryption key(s). Methods for providing this type of tamper resistance are known and so will not be described in detail.

As will be appreciated, employing tamper resistant features in the security module 20 is possible, because once the module 20 is configured by the financial institution it does not need to interact physically with any devices, since all communications are wireless. Including this level of security in, for example, a mobile telephone would require extra hardware, and so physical adaptation of the handset, which would be problematic. Transferring the security to a separate module 20 provides a simple and cost effective solution.

The security module 20 may be a smart card or any other small device with processing capabilities. In a preferred embodiment, the security module 20 is small enough to be carried or fitted into a standard wallet.

Details of the user's mobile device or devices could be written into the secure memory 52 when the secure module 20 is being manufactured, these details being provided by the financial institution. Alternatively, the user's mobile telephone number or other electronic address could be downloaded into the secure memory 52 as part of an initialization carried out when the user first receives the module.

The security module 20 may be given to the user in the premises of the financial institution, for example the user's bank. Pairing with the user's mobile 16 could be done in a private and secure area of the financial institution, suitably screened to prevent other wireless devices from detecting the secure module 20. The pairing could be initiated using a secure mediator device (not shown) provided by the bank, which is adapted to initialize both devices 16 and 20. At this stage, the details of the user's mobile 15 could be transferred or downloaded directly to the control center 14 to be stored together with the other customer information.

To prevent unauthorized mobile devices 16 from being paired with the secure module 20, a one-time PIN could be required for the security module 20 to accept the new connection. Ideally, there would also be a PIN for the mobile device 16. The security mediator is adapted so that entry of each of these codes allows mutual authentication of the two devices. As another option, the module 20 may be provided with a one-time access code, which is stored in its secure memory 52. The financial institution knows this one-time code. When the security mediator is carrying out the initialization it sends the one-time access code to the security module 20, together with details of the authorized mobile 16. When this one-time code is received, the security module 20 recognizes that this mobile device 16 has to be registered. After the authorized device 16 is registered with the module 20, the access code used is either erased from the memory 52 or is marked as having been used already. In this way, even if the access code is illegally intercepted and copied it cannot be used again to register an unauthorized mobile. Of course, a plurality of different access codes could be stored in the secure memory 52 of the module 20 so that other authorized devices can be registered. The other codes are also one-time session codes, which after use by authorized mobiles are either erased or flagged in the secure memory as having been used.

As will be appreciated, when the initial pairing is done in a secure area of the financial institution, any suitable security technique could be employed.

As noted before, the security module 20 is provided to authenticate the mobile device 16 and thereby allow the mobile to interact with the ATM 12. In order for the mobile device 16 to carry out this interaction, it needs a wireless communications port, such as an IR port or Bluetooth port, which is able to communicate with the communications module 56 in the wireless secure module 20 and the communications module 48 in the ATM 12. These ports are commonplace on mobile devices currently available. Also needed is a dedicated software application. This application can be downloaded to the device 16 using any suitable mechanism. Typically, the application is provided as part of the initialization process carried out at the financial institution. It should be noted however that to access services provided by the ATM 12, the user has to be carrying each of the mobile device 16 and the security module 20.

The application stored on the mobile 16 may enable a number of different services, but as a specific example, the provision of money from an ATM 12 will be considered. To allow this, the application is operable to establish a connection with the control center 14. This can be done via the cell phone network or using the wireless communications port to access a local wireless connection such as Bluetooth or a wireless local area network (LAN) operating in a bank branch, which allows the customer to communicate with the bank's systems in the branch. By using a connection mechanism such as Bluetooth or the LAN rather than the telecommunications network, the cost of a mobile telephone call can be avoided. The application in the mobile telephone is also adapted to present screens or interfaces to the user to guide them through various stages, for example establishing what service the user wants to use.

Once an initial connection with the control center 14 is made, the control center is able to identify the mobile device 16 that wants to access services. This means that the control center 14 can identify the secure module 20 with which that mobile 16 is paired.

When the user decides to withdraw cash, the application in the mobile device 16 generates and sends a signal to the control center 14 to notify it of this decision. Using positional information obtained from the telecommunications network provider, the control center 14 is able to identify the location of the user and then identify the nearest usable ATM in the network. Once this is established, a signal indicative of this is sent to the mobile device 16. Alternatively, the user may select a particular ATM using for example a list of ATMs provided by the control center 14. Once this is done, a signal indicative of the chosen ATM is sent to the control center 14. In either case, the user then has to move into the proximity of the selected ATM 12.

Before dispensing cash from the ATM 12 an authentication procedure is carried out. This depends on the proximity of the user to the ATM 12, as well as verification of the details of the mobile device 16. When the user is standing in front of the designated ATM 12, the secure module 20 is used. At this stage, the proximity tag 60 in the secure module 20 is in the reader field that surrounds the ATM. This triggers a detection mechanism in the tag 52, which causes a signal to be sent to the processor 50 in the module 20. The processor 50 recognizes this signal as indicating that the module 20, and so the user, is correctly located in front of, or at least close to, the selected ATM 12. The processor 50 then runs the authentication application, which controls the authentication process.

Figure 5:
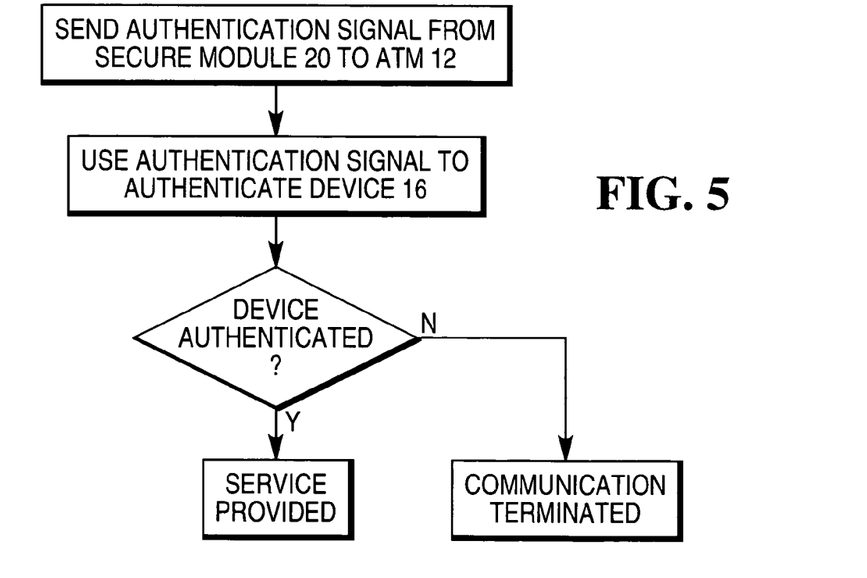
FIG. 5 is a flow diagram of a method for authenticating the mobile device of FIG. 2, thereby to allow services to be provided using the ATM.

There are various ways for implementing the authentication process, each of which involves sending an authentication signal from the wireless security module 20 to the ATM; using the authentication signal to authenticate the mobile device 16, and in the event that the device 16 is authenticated, providing the service requested at the terminal. These steps are shown in FIG. 5.

In a first example, the authentication application in the secure module 20 creates a signal for sending to the ATM 12. This includes an identifier that identifies the module 20, and optionally the telephone number of the user's mobile device 16. This signal is then encrypted using the encryption module 62 and sent to communications port 48 in the ATM 12. The signal is received at the ATM port 48 and decrypted using the decryption module of the ATM application. The ATM 12 then knows the identity of the secure module 20 and optionally the telephone number of the user's mobile. The ATM 12 communicates with the control center 14 to check that the module 20 is an authorized module. To do this, the ATM sends the secure module's unique identifier to the control center 14. The control center 14 searches its register or list of authorized users to identify whether the secure module 20 associated with the secure identifier received from the ATM 12 is on record as being paired with the mobile device 16 that made the initial request for services. In the event that the control center 14 confirms that the module 20 that sent the authentication signal and the mobile 16 that made the request for services are paired, a signal is sent to the ATM 12 to confirm that the transaction can proceed. If necessary, this signal includes the user's mobile telephone number or some other identifier associated with the telephone, for example a unique serial number of the telephone or SIM card information or the address of the wireless communications module built into the telephone. The ATM 12 then sends a signal from its wireless telecommunications port 48 to the mobile device 16 confirming that the transaction can proceed. Once this signal is received and recognized by the mobile device 16, the user is then able to communicate directly with the ATM 12 using the mobile 16 so that the transaction can be concluded. In this case, conclusion of the transaction would be dispensing of the requested amount of money.

In an alternative arrangement, rather than having to interrogate the control center 14 for details of the secure module, the ATM 12 may be primed to listen for signals from the secure module 20. In this case, when authentication is needed, the control center 14 uses details of the mobile device 16 that made the initial request for services to find the identifier associated with the security module 20 that is paired with that mobile 16, and optionally the user's mobile telephone number. If no security module has been paired with that mobile device then the authentication process is terminated and a signal is sent to the ATM 12 to present a statement on its screen 26 to this effect. If, however, the mobile device 16 has been paired with a security module 20 the identifier for this module is found and sent to the designated ATM 12 in advance of the ATM 12 receiving the authentication signal from the user's secure module 20. As before, the user moves into the vicinity of the ATM 12, which triggers the proximity tag 60. This in turn causes the user's security module 20 to send the initial encrypted authentication signal. The information in this initial signal, and in particular the unique identifier for the module 20, is then compared with the data already sent to the ATM 12. In the event that the identifiers match, the transaction is allowed to proceed. In the event that the identifiers do not match, the transaction is terminated. Priming the ATM 12 with the security module's identifier improves the speed of the transaction for the user. This is because it avoids the need for the ATM 12 to make contact with the control center 14 and thereby saves time.

As yet another option, rather than sending an authentication signal to the ATM 12 directly, the authentication application in the secure module 20 may be operable to send the authentication signal to the ATM 12 via the mobile device 16. The mobile 16 could be provided with the address of the individual ATM 12 wireless module. Alternatively, the mobile 16 could be adapted to broadcast a signal to all ATMs in the local area. In this case, when each ATM receives the signal, it notifies the control center 14, which selects which ATM is to provide a response and sends an appropriate command signal thereto. This causes the selected ATM 12 to generate and send a response, which contains its address, to the mobile 16, thereby allowing a connection to be created. Once this is done, the authentication process can proceed.

After the mobile device 16 is authenticated using the secure module 20, communications may be carried out directly between the mobile 16 and the ATM 12. This is because the trust relationship has been passed to the mobile 16. By this it is meant that the ATM 12 trusts the secure module 20 and through the pairing the secure module 20 trusts the mobile device 16, therefore the ATM 12 should trust the mobile 16. In a very secure system, it may be that all communications have to be encrypted. In this case, since the secure module 20 has the encryption key, all communications would have to pass through the secure module 20.

The authentication information provided from the secure device 20 could be in the form of one time session authentication that does not expose the actual key held in the secure device. This would allow the mobile device 16 to provide authentication to the ATM 12 without passing secure information across the wireless interface. In this case, since the authentication is only valid for the current transaction, it cannot be used again in a replay attack even if the information were to be captured by a third party.

The arrangement in which the present invention is embodied provides a secure module 20, which is given to the consumer to allow them to authenticate themselves, and thereby access services using their mobile device, without requiring specialist hardware to be installed on their mobile device 16. Merely by pairing a secure module with the user's mobile device, there is provided a simple and effective security arrangement for authenticating the mobile device. Details of this pairing can be stored in a remote control center and/or in a secure area of the secure module 20. As described above, there are several ways in which the authentication process can be carried out. All that is needed is mechanism for associating the mobile device being used by a customer with a given, identifiable security module that is carried by that same customer.

By providing the secure module, it is possible to implement a secure method of distributing and storing private and public keys for the users in a tamper resistant device that allows the financial institution to maintain their branding of the device.

The secure module of the present invention can be used with a number of mobile devices that the consumer has without requiring the consumer to install security into each mobile device. An advantage of this is that the same strong authentication can be used with all devices, thereby providing a consistent interface and level of security for the consumer in different types of transactions.

Since communications between the mobile device and the secure module are wireless then the consumer does not have to present the secure device to the ATM and so it can remain in their pocket or handbag. This means that the authentication process is essentially transparent to the user, who takes no active part in the process, thereby making it very simple from the user's perspective.

A further advantage of the invention is that the secure module could be used to contain the branding of the financial institution that provided it, something that would be difficult if the secure device were integrated into the consumers mobile device as a SIM card etc.

A skilled person will appreciate that variations of the disclosed arrangements are possible without departing from the invention. For example, whilst the invention has been described in connection with an automated teller machine, it could be applied to a number of other scenarios such as point of sale terminals, or kiosk purchases covering the purchase of tickets, music etc. In addition, although in the specific example described, the initial request for services is communicated via the control center, it will be appreciated that transactions could be initiated at the ATM. This could be done if the customer entered the range of the wireless communications modules 44 and 56, such as Bluetooth, built into the ATM 12 and secure module 20, as well as that of the corresponding wireless communications module in the mobile device 16. In this case, as well as sending an initial request for services, the mobile device 16 sends a signal telling the secure module 20 to open up a secure communication channel using the key exchange mentioned previously. If the module has not already created any links but wishes to make a connection then it could broadcast a signal to all devices in the area. The ATMs that receive the signal could notify the control center 14, which selects the ATM that should respond to the message and start the authentication. The selected ATM then responds, interacts with the secure module 20 as previously described to authenticate the mobile 16 and provides the services requested, such as access to account and balance information. It should be noted that when communications are opened with the ATM 12, the customer is not necessarily in the range of the RFID tag, but is in the range of the larger wireless connection for the ATM 12, such as a Bluetooth connection. Only once the cash is to be collected does the user move close enough to the ATM 12 to trigger the RFID tag. In this case, the ATM 12 already has a secure link to the mobile 16 and secure unit 20 and so all it has to do is match up the pending cash dispensing transaction with the device physically in front it and fulfil the transaction. This model can also be used in a branch type scenario where instead of connecting to the control center 14, the customer actually connects to an ATM 12 and carries out their wireless interaction with it. In this case the actual request for cash could then be put onto the ATM network and carried out at any ATM on the network when an ATM is triggered by the RFID tag on the secure module 20.

Accordingly, the above description of a specific embodiment is made by way of example only and not for the purposes of limitation. It will be clear to the skilled person that minor modifications may be made without significant changes to the operation described.

What is claimed is:

1. A system for authenticating a mobile device, the system comprising:

a wireless security module separate from and having a preestablished relationship with the mobile device, the wireless security module having a secure memory storing security information establishing the preestablished relationship between the security module and the mobile device and including means for sending an authentication signal for authenticating the mobile device;

means for authenticating the mobile device based upon the authentication signal from the wireless security module; and a wireless receiver for receiving the authentication signal, the means for authenticating the mobile device including means for establishing a trust relationship between the security module and an external device to which the mobile device seeks to be granted access, the means for authenticating the mobile device further operating to verify the existence of the preestablished relationship between the security module and the mobile device so that the trust relationship established for the security module can be granted to the mobile device.

2. A system as claimed in claim 1, wherein the wireless receiver is provided in a terminal.

3. A system as claimed in claim 2, wherein the terminal comprises a self service terminal.

4. A system as claimed in claim 3, wherein the terminal includes means for providing a service requested from the mobile device, in the event that the mobile device is authenticated.

5. A system as claimed in claim 4, wherein the terminal includes means for communicating with the mobile device to provide the requested service.

6. A system as claimed in claim 5, wherein the terminal is part of a network of terminals.

7. A system as claimed in claim 6, wherein any one of the terminals can be used to provide the requested service.

8. A system as claimed in claim 2, wherein the terminal comprises an automated teller machine having a mechanism generating a reader field to sense the presence of the wireless security module within a predetermined proximity of the automated teller machine.

9. A system as claimed in claim 8, wherein the wireless security module further comprises an RFID proximity tag for providing proximity information to be sensed by said mechanism.

10. A system as claimed in claim 1, wherein the mobile device is utilized to request the ATM to dispense cash, but cash dispensing is inhibited until both mobile devices have been authenticated and the wireless security module has been sensed within the predetermined proximity of the automated teller machine.

11. A system as claimed in claim 1, wherein the authentication signal includes a unique identifier associated with the mobile device.

12. A system as claimed in claim 1, wherein the wireless security module includes an encryptor for encrypting the authentication signal.

13. A system as claimed in claim 12, further comprising means for decrypting the authentication signal.

14. A system as claimed in claim 1, wherein all or at least part of the wireless security module is tamper resistant.

15. A method of authenticating a mobile device, the method comprising:

sending an authentication signal from a wireless security module which is paired with the mobile device and which is separate from the mobile device, the security module including stored information indicating an association between the security module and the mobile device, the authentication signal including information for establishing a trust relationship between the security module and an external device with which the mobile device is to be used, the authentication signal including information indicating the association between the security module and the mobile device;

receiving the authentication signal;

establishing a trust relationship for the security module based on the authentication signal; and authenticating, at the external device, the mobile device based upon the received authentication signal, authenticating the mobile device based on the received authentication signal including sharing the trust relationship established for the security module.

16. A wireless security module for pairing with a mobile device separate from the security module and authenticating the mobile device, the wireless security module comprising:

means for storing security information indicating an association between the security module and the mobile device means for providing an authentication signal to an external device with which the mobile device to be used is the authentication signal including information for establishing a trust relationship between the security module and the external device, the authentication signal including further information indicating the association between the security module and the mobile device, in order to allow the mobile device to share the trust relationship established between the security module and the external device; and means for sending the authentication signal to allow the mobile device to be authenticated using a wireless communication path.

17. A wireless security module as claimed in claim 16, wherein the authentication signal includes a unique identifier for identifying the module uniquely.

18. A wireless security module as claimed in claim 16, further comprising a proximity tag for identifying the proximity of the module relative to a terminal.

19. A wireless security module as claimed in claim 18, wherein the proximity tag comprises an RFID tag.

20. A wireless security module as claimed in claim 16, further comprising a secure memory for storing at least one identifier for identifying the mobile device.

21. A wireless security module as claimed in claim 16, further comprising an encryptor for encrypting messages for sending to the mobile device or terminal.

22. A wireless security module as claimed in claim 21, wherein a key for use in an asymmetric encryption method is stored in the secure memory.

23. A wireless security module as claimed in claim 16, further comprising means for communicating with the mobile device.

24. A wireless security module as claimed in claim 16, wherein the module comprises a data storage device that can be accessed wirelessly.

25. A wireless security module as claimed in claim 16, further comprising means for sending the authentication signal to a self-service terminal.

26. A self-service terminal comprising:

means for receiving from a wireless security module an authentication signal for authenticating a mobile device separate from the security module; and means for determining whether the mobile device is authorized to access services based upon the authentication signal, the means for determining whether the mobile device is authorized to access services being operative to determine whether the authentication signal includes information authorizing the establishment of a trust relationship between the security module and the self-service terminal, the means for determining whether the mobile device is authorized to access services being further operative to determine whether the authentication signal includes information indicating an association between the security module and the mobile device so as to allow the mobile device to share any trust relationship that may be established for the security module.

27. A self-service terminal as claimed in claim 26, further comprising means for providing information and services requested from the mobile device, in the event that the mobile device is authenticated.

28. A self-service terminal as claimed in claim 26, further comprising means for communicating with the mobile device.

29. A self-service terminal as claimed in claim 26, further comprising means for communicating with a remotely located control center in order to determine whether the mobile device is authorized.

30. A self-service terminal as claimed in claim 29, further comprising means for receiving details of a service requested by the mobile device from the control center.

31. An automated teller machine (ATM) comprising:
means for receiving from a wireless security module an authentication signal for authenticating a mobile device separate from the security module;
means for determining whether the mobile device is authorized to access services based on the authentication signal received, the means for determining whether the mobile device is authorized to access services being operative to determine whether the authentication signal includes information authorizing the establishment of a trust relationship between the security module and the ATM, the means for determining whether the mobile device is authorized to access services being further operative to determine whether the authentication signal includes information indicating an association between the security module and the mobile device so as to allow the mobile device to share any trust relationship that may be established for the security module; and
means for providing information and services requested from the mobile device, in the event that the mobile device is authenticated.

32. A method of operating an automated teller machine (ATM), the method comprising:
receiving from a wireless security module an authentication signal for authenticating a mobile device separate from the security module;
determining, at the ATM, whether the mobile device is authorized to access services based on the authentication signal received, determining whether the mobile device is authorized to access services including determining whether the authentication signal includes information authorizing the establishment of a trust relationship between the security module and the ATM determining whether the mobile device is authorized to access services further including determining whether the authentication signal includes information indicating an association between the security module and the mobile device so as to allow the mobile device to share any trust relationship that may be established for the security module; and
providing information and services requested from the mobile device, in the event that the mobile device is authenticated.

33. A method as claimed in claim 32, further comprising communicating with a remotely located control center in order to determine whether the mobile device is authorized.

34. A method as claimed in claim 33, further comprising receiving details of one or more services requested by the mobile device from the control center.

* * * * *